Nov. 28, 1939.    J. P. WALKER    2,181,687
OIL, GAS, AND WATER SEPARATOR
Filed Dec. 17, 1937    4 Sheets-Sheet 1

Inventor
Jay P. Walker

Jack A. Ohley
Attorney

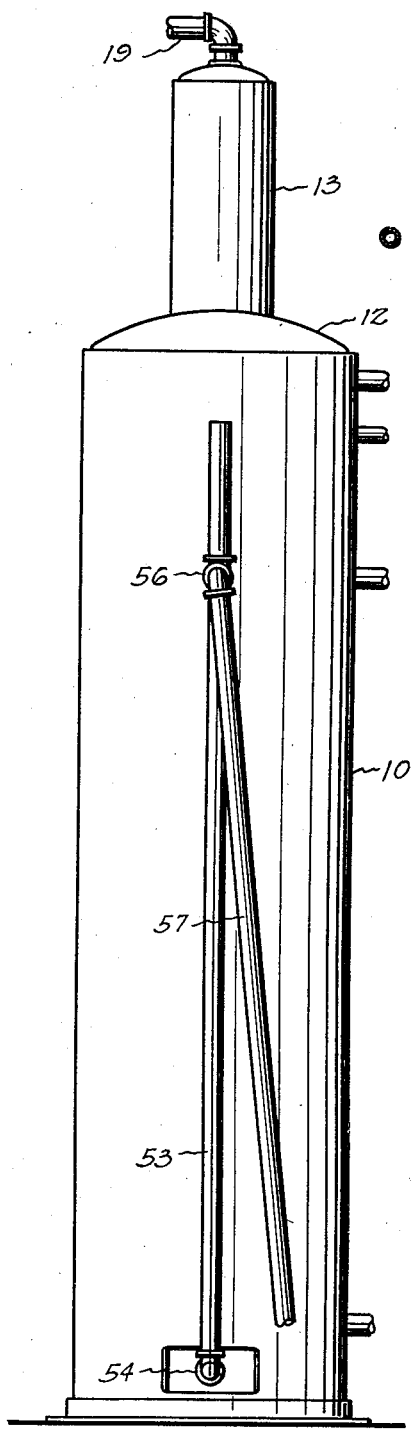
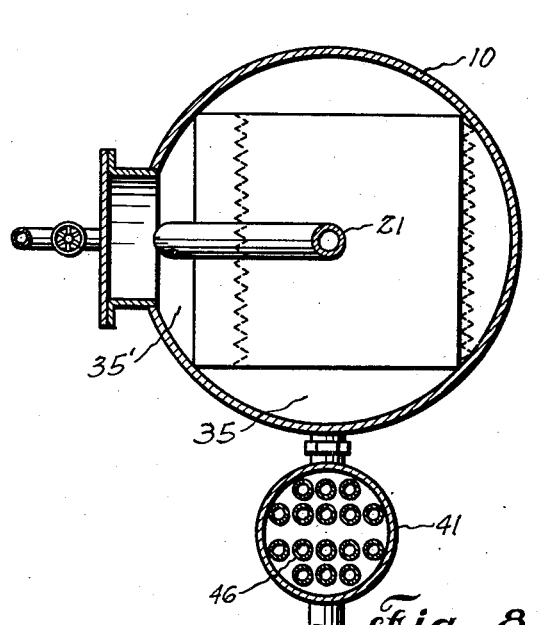
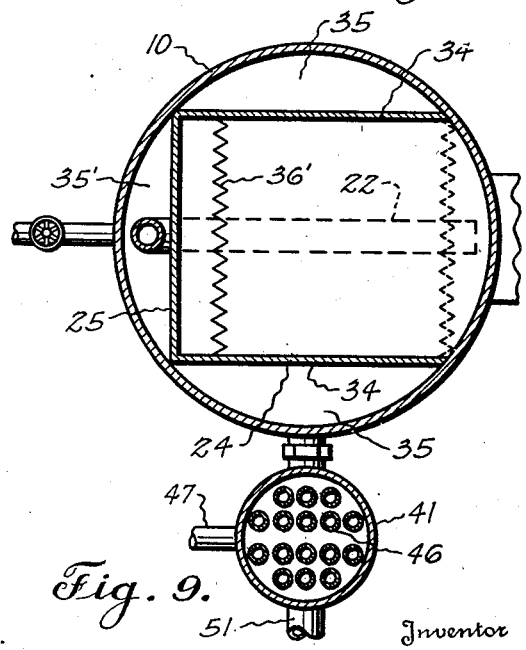

Nov. 28, 1939.  J. P. WALKER  2,181,687
OIL, GAS, AND WATER SEPARATOR
Filed Dec. 17, 1937  4 Sheets-Sheet 3

Inventor
Jay P. Walker

Nov. 28, 1939.   J. P. WALKER   2,181,687
OIL, GAS, AND WATER SEPARATOR
Filed Dec. 17, 1937   4 Sheets-Sheet 4

Inventor
Jay P. Walker
By Jack A. Ashley
Attorney

Patented Nov. 28, 1939

2,181,687

UNITED STATES PATENT OFFICE 2,181,687

OIL, GAS, AND WATER SEPARATOR

Jay P. Walker, Tulsa, Okla., assignor of forty per cent to Guy O. Marchant and six per cent to C. G. Wells, both of Tulsa, Okla.

Application December 17, 1937, Serial No. 180,459

6 Claims. (Cl. 183—2.7)

This invention relates to new and useful improvements in oil, gas and water separators.

One object of the invention is to provide an improved separator of the class described particularly adapted to treat emulsions and emulsified mixtures and employing heated water.

A particular object of the invention is to provide a separator of the character described including an upright tank provided with a separating tower at its upper end arranged to receive an oil, gas and water mixture and separate a major portion of the gas, whereby a predominantly oil and water mixture is carried down into the tank for treatment to extract the water.

A further object of the invention is to provide an apparatus for continuously treating oil, gas and water mixtures, wherein the mixture is first preheated to promote separation of the mixed fluids in a suitable preheater and conducted from said preheater to a separating tower wherein the major portion of the gas is scrubbed out and the residual oil and water mixture carried down into the bottom of a tank and then carried upwardly through a body of hot water, whereby the oil is extracted and heated and floats upon the water in the upper portion of the tank. The recovered oil being carried off from one outlet and the separated water being discharged through another outlet.

An important object of the invention is to provide a separator having a separating tower at the top of a tank with an influent inlet located to give the fluids elongated travel paths and cause them to ascend and descend in more or less columnar form, whereby separation is promoted.

A construction designed to carry out the invention will be hereinafter described together with other features of the invention.

Figure 1:
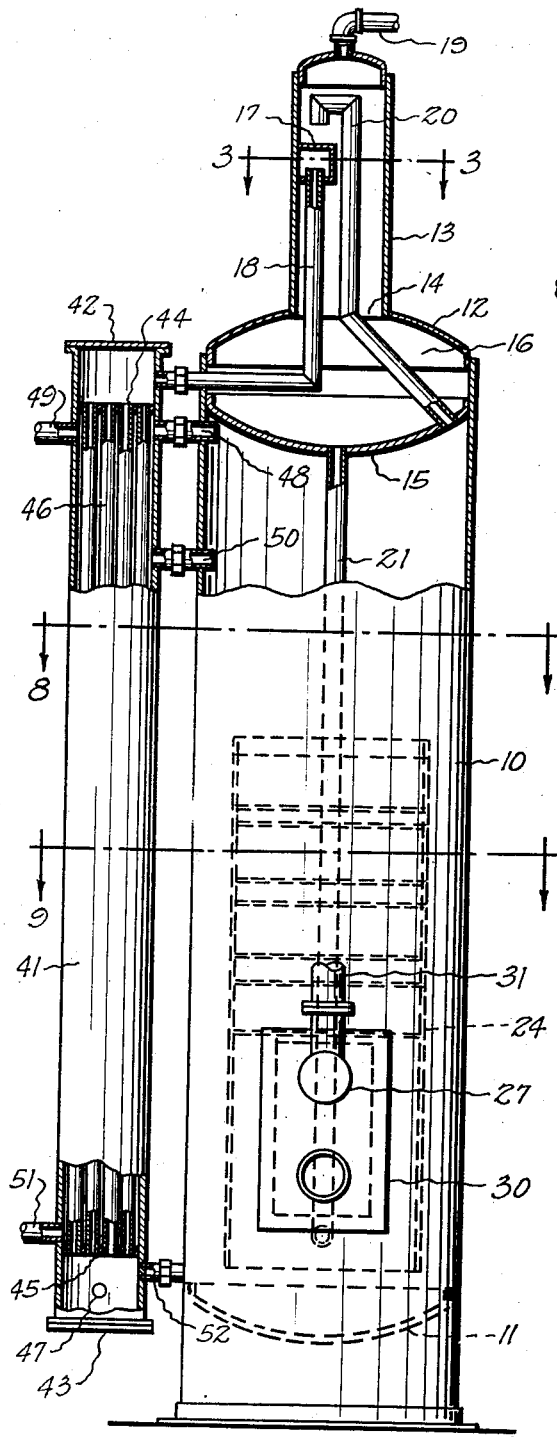
Figure 2:
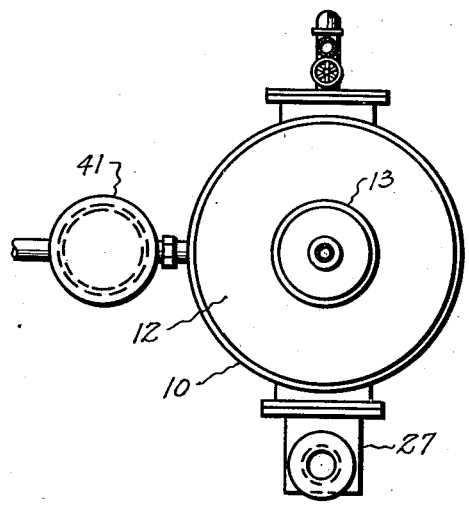
Figure 3:
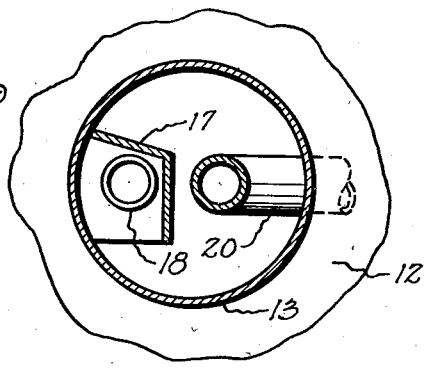
Figures 5, 6:
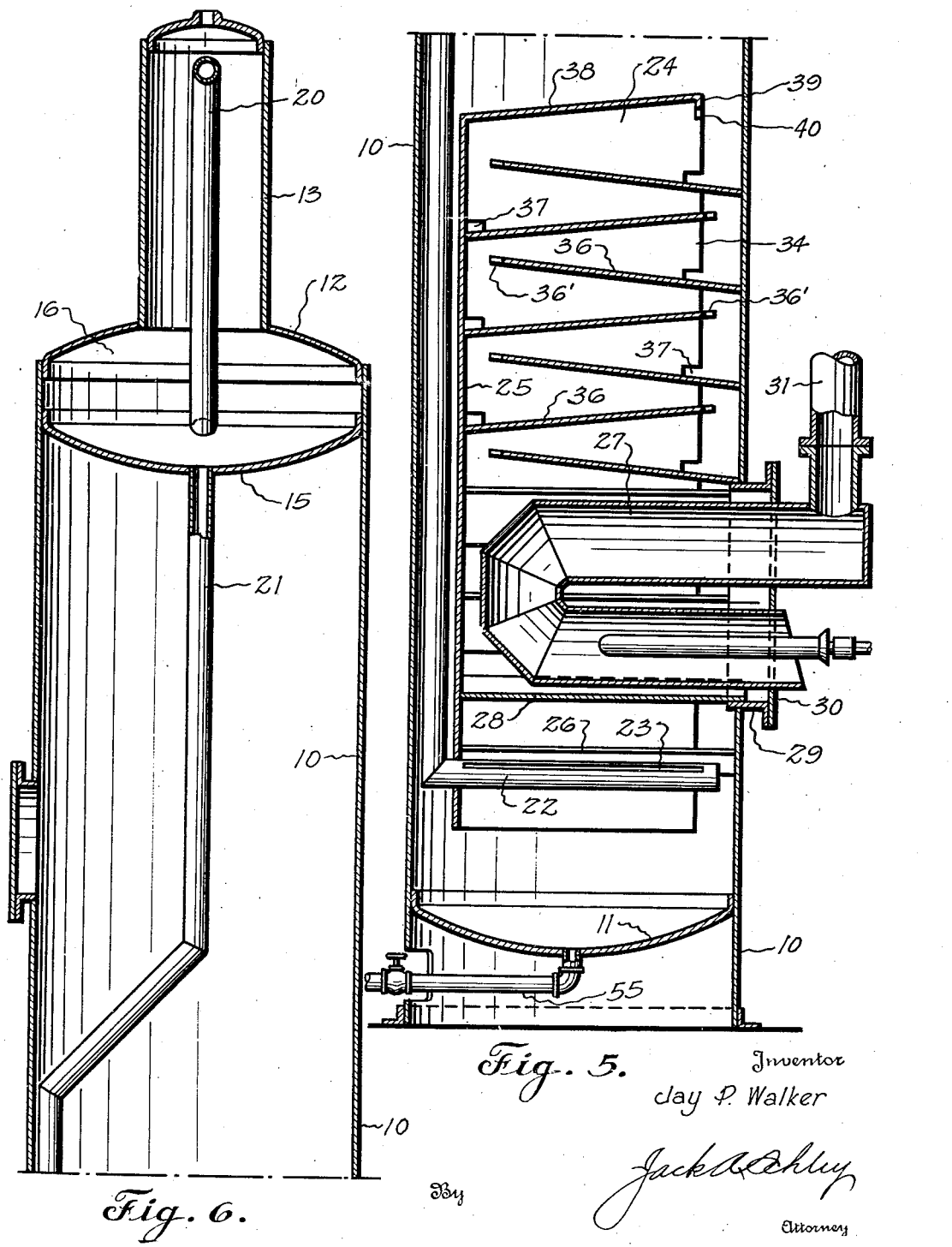
Figure 7:
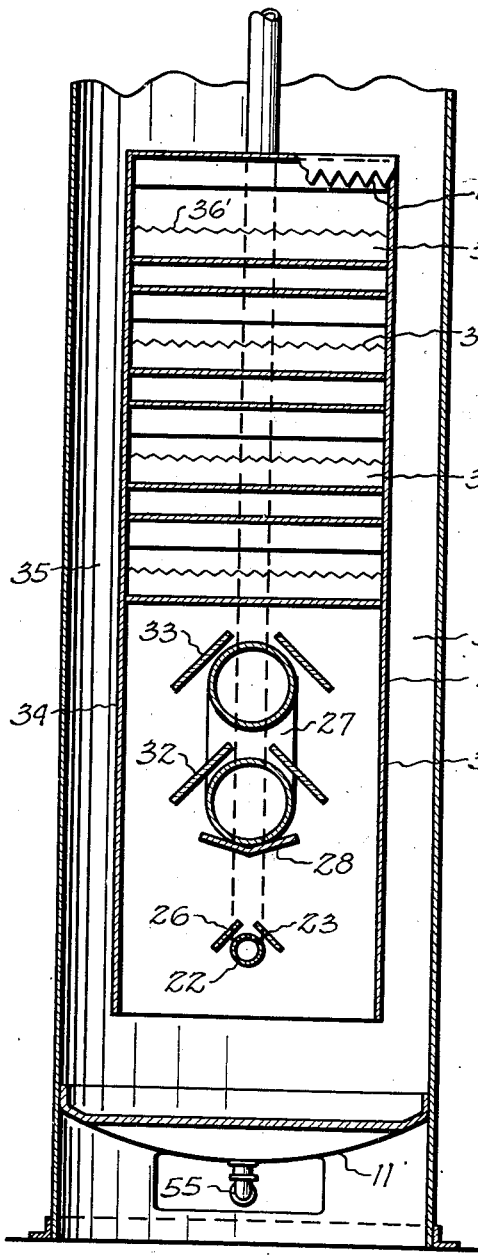
Figure 10:
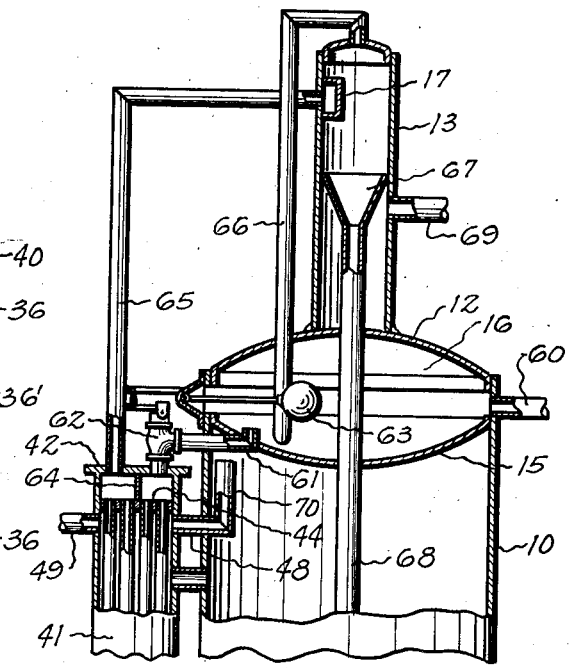
Figure 11:
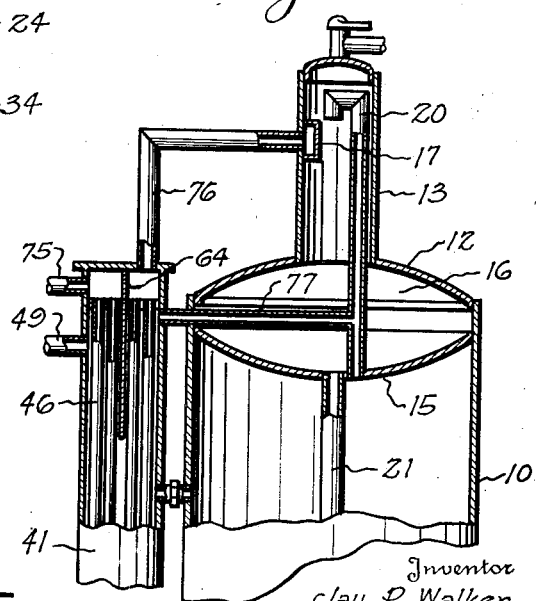

The invention will be more readily understood from a reading of the following specification and by reference to the accompanying drawings, in which an example of the invention is shown, and wherein:

Figure 1 is a view partly in elevation and partly in vertical section of an apparatus constructed in accordance with the invention, Figure 2 is a plan view, Figure 3 is an enlarged, horizontal, cross-sectional view taken on the line 3—3 of Figure 1, Figure 4 is an elevation of the apparatus showing the water discharge device, Figure 5 is an enlarged, transverse, vertical, sectional view of the lower portion of the apparatus, Figure 6 is a similar view of the upper portion of the apparatus, Figure 7 is an enlarged, transverse, vertical, sectional view at right angles to Figure 5, Figure 8 is an enlarged, horizontal, cross-sectional view taken on the line 8—8 of Figure 1, Figure 9 is an enlarged, horizontal, cross-sectional view taken on the line 9—9 of Figure 1, Figure 10 is a vertical, sectional view of the upper portion of a modified form of apparatus, and Figure 11 is a similar view of another form of apparatus.

This application is filed as a continuation in part of my co-pending application Serial No. 100,655 and includes matter disclosed in my abandoned application Serial No. 13,675.

In the drawings, the numeral 10 designates an upright, cylindrical tank, having an elevated bottom 11 and a crowned top 12. A vertical tower 13 rises from the central portion of the top and has its bottom open at 14 to communicate with the interior of the tank. The location of the tower on the top may be altered, but it is important that the tower have sufficient height to carry out the separating function. A dished head 15 is secured in the upper end of the tank a short distance below the top 12, with which it co-acts to form a receiving chamber 16. However, neither the head 15 nor the chamber 16 are essential to the invention.

In the tower 13, at about mid-height is a diverter box 17 which is shown best in Figures 1 and 3. The oil, gas and water mixture is delivered to this box, which owing to its construction causes the influent mixture to be diverted onto the upright wall of the tower and whirled around in the tank. An influent pipe entering the tower at a tangent would do the same thing. While the influent may be delivered to the box 17 in any suitable manner, I prefer to conduct it by a right angular pipe 18 extending from a preheater 41 through the side wall of the tank into the chamber 16 and thence up the tower to the bottom of the diverter box 17. The advantage of this arrangement is that the influent flowing through an inside pipe is less likely to cool than if it flowed through an outside pipe; however, an outside pipe may be used.

The upper end of the pipe 18 discharges into the diverter box 17, whereby the influent is caused to take a circumferential course around the inner wall of the tower 13. The influent is scrubbed on the wall of the tower and the liquids take a downward helical course, while the gas and gaseous fluids, which are separated by the scrubbing action, taken an upward helical course. A gas escape pipe 19, such as is common in separators leads from the top of the tower and includes the usual control valve (not shown), whereby the escape of gas may be controlled.

The major portion of the gas is separated in the tower. Owing to the columnar form of the tower the helical courses of the fluids will be elongated, whereby a more thorough scrubbing will be performed. The liquids will discharge through the opening 14 at the bottom of the tower into the chamber 16. In order to equalize gas pressures above and below the head 15 and also for the purpose of remixing gas with the treated oil collected in the tank below the head, an angular gas pipe 20 extends from the head 15 up into the tower above the box 17.

The liquids which have been primarily separated from the gas, but which contains some gas in solution, flow from the chamber 16 down through an axial discharge pipe 21. The pipe extends from the bottom of the head 15 to the midportion of the tank where it is offset so as to extend down the tank in proximity to the wall thereof. It will be noted that the offset portion of the pipe 21 extends down between the wall of the tank and the vertical wall 25 of an upright housing 24. At its lower end the pipe 21 is connected to one end of a horizontal nozzle 22 which extends diametrically across the tank, as is best shown in Figures 5 and 9. The nozzle 22 has slots 23 therein and these slots may be located wherever desired. In Figure 7 one of the slots is shown on side of the upper portion of the nozzle, however, perforations may be used. The mixture or emulsion composed of oil and water and more or less free from gas, is discharged from the nozzle into the lower portion of the housing 24.

The mixture discharged from the nozzle impinges a pair of longitudinally spaced inclined baffles 26, which overhang the nozzle 22 (Figure 7). The major portions of the flow streams will pass between the adjacent edges of the baffles, while some portions may pass around the lower edges thereof. A U-shaped fire box 27 is disposed transversely above the baffles 26 and is shown as supported in a V-shaped trough 28 extending diametrically across the housing from a manhole 29 in the side wall of the tank. The fire box is mounted in a cover 30 fastened on the manhole, whereby the ends of the fire box protrude from the tank. The lower leg which is open at its outer end may receive a gas burner or other heating element (not shown), while the upper end may be connected with a stack 31.

The trough 28 acts as a deflector for the mixture causing it to flow up each side of the lower leg of the fire box, which leg overhangs said trough. Inclined baffles 32 are arranged above the lower leg of the fire box, while inclined baffles 33 are arranged above the upper leg thereof. These baffles are inclined and disposed similarly to the baffles 26 and act to direct the mixture against the legs of the fire box and heat it. After passing between the baffles 33 the oil-water or mixture flows upwardly in the housing. A water level is usually maintained above the housing 24, but the top of the housing need not in all operations, be immersed.

By observing Figures 5, 7, 8 and 9 it will be seen that the housing is substantially rectangular in plan, the tank wall forming one vertical side opposite the wall 25, which latter for convenience may be termed the rear wall, being opposite the manhole 29. The vertical sides of the housing are formed by side walls 34 and between these side walls and the wall of the tank segregated upright or vertical passages or return channels 35 are formed, because the said walls have their vertical edges in contact with the tank wall. The wall 25 forms with the tank a front passage 35'. Liquids flowing down any of these passages, channels or spaces are discharged from their lower ends and enter the housing below the nozzle 22. The tendency of the liquids flowing into the housing would be to rise outside of the baffles 26, 32 and 33 and to admix with the influent liquids from the nozzle 22, in the zone of the fire box and immediately thereabove. There is, of course, maintained a body of water, some portions of which may remain more or less stationary while the other portions may flow up and down through said body.

One of the results sought is to reduce the heat necessary to carry out efficient separation. By reducing the artificial heat, not only is there saving in fuel cost, but there is a more important saving by preventing excessive losses of the lighter or more volatile gases or gaseous fluids, such as gasoline, butane, octane, hexane and the like, which losses are due to vaporization because of excessive heat. The upwardly flowing emulsion mixture passing from the zone of the fire box 27 in the housing 24, will encounter the lowermost of a series of staggered upwardly inclined baffles 36, alternately having their lower ends fastened to the tank wall and the front wall 25. The upper free edges 36' of the baffles 36 may be serrated so as to cause the liquids flowing therearound to sub-divide into numerous small streams.

The tendency of the flowing mixture will be to flow along the under sides of the baffles. The oil or oily liquids will float upwardly, while the water which is scrubbed out will descend or settle onto the upper surfaces of the baffles and run down the same. Drain openings 37 are provided in the side walls 34, either at the lower ends of the baffles 36 or adjacent thereto and the extracted water will escape therethrough into the return channels 35. The top 38 of the housing may also be inclined and provided at its free edge with an apron 39 having its lower edge 40 serrated.

By use of the inclined baffles 36, important advantages are had. The emulsion or oil and water mixture which passes up through the housing 24 is thoroughly washed. The effectiveness of this washing operation is governed, to a large extent, by the length of the path through the body of heated water, which is travelled by the emulsion. If the baffles were not used, a very high tank, possibly more than fifty feet high would be required to secure efficient washing. An elongated travel path is highly desirable. The slightly inclined baffles, while permitting an upward flow of emulsion, cause it to flow back and forth across the tank, which gives an opportunity for thorough washing and precipitation of the water.

The serrated edges or saw teeth 36' and 40 are very important as they assure a spreading of the flow and its division into numerous small streams. The baffles 36 are shown in staggered relation, but they may be arranged in any manner which will elongate the travel path of the emulsion. The introduction of emulsion from the pipe 21 by way of the nozzle 22, below the baffles assures an upward flow around and between said baffles.

This washing operation has been found very effective and has reduced the amount of chemical used; and in some cases it may be eliminated entirely. While I have provided for heating the liquids within the tank, there are conditions in which the heating could be omitted from the tank. The emulsion might be heated in any suitable manner before introducing it into the tank. Artificial heat may be applied in any suitable manner.

The openings 37 are very important as they permit the water to drain from the upwardly moving fluid. It is highly desirable to take the separated water away from the rising oil as rapidly as possible. It is obvious that the water will be constantly seeking to settle or return to the bottom of the tank, while the oil will be constantly ascending. By the time the flow reaches the oil zone all of the water will be scrubbed out or extracted and the liquid will be substantially entirely oil and some gas in solution.

It is pointed out that the water, which accumulates in the bottom of the tank, will have a lower temperature than the liquids passing between the baffles 36 and consequently a thermo-syphon action will be set up, whereby a circulation of water will be provided down through the channels 35 and upwardly within the housing 24. This recirculating of the water aids in heating the influent discharged from the nozzle 22, thus requiring less heat to be supplied by the fire box 27. Further, the heated water passing downwardly around the housing and within the tank tends to insulate, by heat exchange, the fluids and liquids being heated within the housing 24, against temperatures outside of the tank, which temperatures may be quite low.

As before pointed out, it is highly desirable to reduce the amount of heat necessary to treat the emulsion within the tank. This may be largely accomplished by preheating the influent before it enters the tank, but it may also be accomplished through the use of thermo-syphon system and the elongation of the path through which the emulsion travels from the time it is discharged from the nozzle until it reaches the upper portion of the tank. It is desirable to handle the influent at or near atmospheric pressure in order that the major part of the gas will rise from the oil emulsion as it enters the tank, thereby minimizing the loss of the highly volatile gases by the subsequent heat treatment. By first removing the major portion of the gas and then heating the emulsion mixture and circulating it as described, the water may be effectively precipitated. Then by admixing with the treated oil, gas or gaseous fluids, after the water has been removed, the oil is brought nearer to its original gravity, and is not subjected to the great losses of valuable constituents, as in the common method now in use.

It is desirable to reduce the amount of chemical used in dehydrating the influent and if possible to do away with its use altogether. Such a result may be accomplished to a great extent by preheating the influent as it comes from the well or other source and is about to enter the tank 10. A preheater and cooler 41 is mounted vertically of the tank, as is best shown in Figure 1. This device has a cylindrical shape and is closed at its upper end by a cap 42 and at its lower end by a cap 43. A head 44 is spaced a short distance below the cap 42, while a head 45 is spaced a short distance from the bottom cap 43. These heads are connected by vertical tubes 46. An influent pipe 47 enters the bottom of the preheater and cooler between the cap 43 and the head 45. The influent flowing up through the tubes is discharged into the space above the head 44 and the inlet pipe 18 is connected with the preheater so that the influent which flows up the tubes 46 is conducted to said pipe, and thence through the chamber 16 and up the tower 13 to the diverter 17.

Just below the head 44 the preheater and cooler is connected with the gas space of the tank by a pipe 48 while a gas outlet 49 leads from the opposite side of the preheater. This permits the gas to escape from above the oil level and as it passes around and contacts with the tubes through which the cold influent enters, it is obvious that by reason of this passage and contact, the gas will be cooled before it enters the pipe, whereby the liquefiable constituents are condensed and dropped out into the oil. The oil level in the tank is maintained by an oil outlet pipe 50, and oil is constantly discharged into the preheater below the head 44 and flows down around the tubes 46. An oil outlet pipe 51 leads from the preheater and cooler just above the head 45. From the foregoing it will be seen that the hot oil flowing out through the pipe 50 passes down through the preheater and cooler between the tubes 46 and by reason of heat exchange, the cold influent passing upwardly through said tubes is preheated and the hot oil is thereby cooled. The lower end of the preheater is supported from the tank by a deadened pipe 52, there being no connection with the tank at this point, whereby fluid will flow thereinto.

The preheating of the influent is very important because it reduces the amount of chemical which may be necessary. Where chemical is used, it has been found that a very efficient mixing of the chemical with the influent is had, by introducing it into the influent, due to the presence of the gas in the incoming emulsion flowing through the heat exchange tubes, which gas because of the turbulence and agitation set up thereby, tends to more thoroughly admix the chemical with the emulsion. The influent is gradually heated and when it reaches the housing it does not require very much more heat in order to carry out the water separation. By reducing the heat and releasing as much as possible of the gas, in the upper portion of the tank under the lowest possible pressure, before conducting the emulsion mixture to the heating zone, much better results are obtained and more efficient water precipitation is obtained.

In order to control the water level in the tank 10, an adjustable stand pipe 53 (Figure 4) is employed. This pipe is connected with a plugged T 54 at its lower end, which in turn is connected in a water discharge pipe 55 leading from the bottom of the tank. The stand pipe and T are arranged to swing. An elbow 56 is connected to the pipe 53 a short distance below the upper end, and the elevation of this elbow controls the water level in the tank. A discharge pipe 57 leads downwardly from the elbow. The water in the pipe 53 will be higher than the water level in the tank 10, due to the additional weight of the oil floating on the water. It will be seen that by swinging the pipes 53 and 57, the elbow 56 will be raised or lowered and thus the water level in the tank controlled. Of course, any other controlling means might be used.

In using the separator, it is sometimes necessary to fill the tank to the water level with salt water. If natural salt water is not available then it is necessary to mix about two hundred and fifty pounds, more or less, of salt to each one hundred barrels of water. However, it has been found that the method may be successfully performed by merely flowing the influent from the well into the tank to a level above the burner, or in providing any other liquid level, and then supplying heat. When the tank 10 has been filled to the proper level with salt water or other liquid, heat is supplied to the firebox 27 by a suitable burner. It may take several hours to heat the water or other liquid to the proper degree, which will ordinarily range from below one hundred and seventy degrees or more Fahrenheit, according to the emulsion to be treated. As the water is heated it will circulate through the housing 24 and the passages 35 and 35' (Figures 5, 7, 8 and 9). When the water or other liquid has been sufficiently heated, the influent is admitted from the pipe 47 and caused to flow up through the tubes 46 and enter the pipe 18 which will deliver it to the diverter 17.

The influent which is discharged into the diverter 17 is carried around the inner wall of the tower 13, and thereby a considerable amount, usually the majority of the gas is thus scrubbed out; however, some gas will remain in solution. The oil and water mixture will flow helically down the tower and accumulate in the chamber 16. The gas which is separated may either enter the pipe 20 and pass down through said pipe to the upper portion of the tank above the oil level and escape through the pipe 48 into the preheater and cooler 41, from which it will escape through the pipe 49; or preferably the major portion may pass out through the pipe 19, depending upon the opening of the valve (not shown) in the said pipe 19.

The oil and water mixture flowing down the pipe 21 from the chamber 16, will be discharged from the nozzle 22 through the slots 23 into the lower end of the housing 24. This oil and water mixture will flow upwardly through the housing, around the fire box and between the baffles 36. The water and oil will thus be separated so that the oil which rises to the oil level will pass out through the pipe 50 into the preheater 41. This oil will be hot and in passing down and around the tubes 46 it will be cooled by the heat exchange, as hereinbefore set forth. The oil finally discharges through the pipe 51 and may be conducted to a suitable tank.

The circulation and recirculation of the water through the housing 24 and the return channels 35 and 35', is of vast importance in the general performance of the separator and ties in with the primary separation of the gas in the tower 13. If the gas were not separated in the tower there would be a violent agitation in the lower portion of the tank and the thermo-syphonic circulation would be unsatisfactory. The return water which passes down the channels 35 and 35' is more or less quiescent and will cool quicker. Also by first removing the gas the residual liquids will move more slowly through the body of heated water.

The hot vapors which rise from the hot oil will contact the bottom head 15 of the chamber 16. The bottom head being much cooler because of the lower temperature of the liquids in said chamber will cause the vapors to condense and drop out the liquefiable fractions. The condensate dropping from the head into the body of heated oil will build up the gravity of the same.

After the operation has started, considerable less heat will be required because of the hot oil passing through the preheater and the circulation of the liquids within the tank. The preliminary separation whereby the major portion of the gas is separated from the oil and water, makes it much more easy to precipitate the water and carry out the separation. It is obvious that the more the influent is heated the greater will be the expansion of the gas and, therefore, the greater the agitation. By keeping down the heat and increasing the travel path through the housing 24, there is less agitation and less expansion and consequently less loss of gaseous vapors. The water will, of course, gradually settle and pass off through the pipe 55. The dividing of the mixture into small streams by the saw-teeth 36' and 40, greatly enhances the separation.

In Figure 10 I have shown another form of the invention in which the influent enters the chamber 16 from a pipe 60 from which it escapes through a pipe 61 to the top of the preheater 41. The influent is caused to accumulate in the chamber by a valve 62 actuated by a float 63 in said chamber. A diametrical partition 64 divides the space between the cap 42 and the head 44 and the influent from the pipe 61 enters on one side of said partition. The influent pipe 47 is omitted, so that the influent which flows down the tubes 46 on the side of the partition 64 will flow up the tubes on the other side thereof and discharge into the space above said tubes.

A pipe 65 leads from the cap 42 to the diverter 17 in the tower 13. A gas equalizing pipe 66 leads from the top of the tower down through the chamber 16 and head 15. Below the diverter 17 is a hopper 67 which catches all of the separated water and oil and discharges this residual liquid into a pipe 68 which extends down through the head 15 and is otherwise the same as pipe 21. A gas outlet pipe 69 extends from the tower just below the funnel 67.

Some gas will be separated in the chamber 16 and such gas will rise into the tower 13 and escape by way of the pipe 69, which may be valve controlled. The gas liberated in the tower above the funnel could be carried off as in Figure 1, but will be carried down through the pipe 66 and discharged through the elbow 70 and the gas discharge pipe 48.

In Figure 11, still another structure is shown which is similar to Figure 10 except that the influent enters the top of the preheater 41 through a pipe 75 on one side of the partition 64 and after passing down and up the tubes 46, in a reverse order to Figure 10, flows out through a pipe 76, leading from the other side of said partition. As in Figure 1 the pipe 76 discharges into the diverter 17, but into the side thereof, instead of into its bottom. Instead of the gas escape pipe 48, a gas discharge pipe 77 leads from the gas pipe 20 to the preheater.

This application is directed to the tower structure into which the influent is introduced, a similar structure being shown in my co-pending application, Serial No. 100,655, but not claimed therein. The application also includes other structure in combination with the foregoing, which is not claimed in said co-pending application.

What I claim and desire to secure by Letters Patent, is:

1. In an oil, gas and water separator, an upright tank, a tower surmounted upon the top of the tank and extending above the same, means for introducing an oil, gas and water mixture into the tower intermediate its ends, and for causing the mixture to whirl around the tower to quickly scrub out the major portion of the gas, a gas pipe leading from the tower above the inlet thereto, a pipe for carrying the residual oil and water mixture steadily from the tower down through the tank to the lower portion thereof, means for carrying off water from the tank and maintaining a body of water therein, inclined baffles within the tank immersed in the body of water providing a continuous back and forth travel of the oil and water mixture transversely through the body of water, means for artificially heating the body of water, means for discharging oil from the upper portion of the tank, the oil and water pipe extending down one side of the tank adjacent the wall thereof, and an upright partition contiguous to the conductor and separating the baffles therefrom, said baffles coacting with the partition to elongate the upward travel of the oil and water mixture discharged from the conductor.

2. In an oil, gas and water separator, an upright exterior preheater having an influent inlet and an influent outlet for preheating an emulsion mixture, an upright tank contiguous to the preheater, a tower surmounted upon the top of the tank, a pipe connected with the influent outlet of the preheater for introducing an oil, gas and water mixture into the tower intermediate its ends, whereby the mixture is whirled around the tower and the major portion of the gas is quickly scrubbed out, a gas pipe leading from the tower above the inlet thereto, a pipe for steadily carrying the residual oil and water mixture from the tower down through the tank to the lower portion thereof, means for carrying off water from the tank and maintaining a body of water therein, inclined baffles within the tank immersed in the body of water providing a continuous back and forth travel of the oil and water mixture transversely through the body of water, means for artificially heating the body of water, means for discharging oil from the upper portion of the tank, the oil and water pipe extending down one side of the tank adjacent the wall thereof, and an upright partition contiguous to the conductor and separating the baffles therefrom, said baffles coacting with the partition to elongate the upward travel of the oil and water mixture discharged from the conductor.

3. In an oil, gas and water separator, a large upright tank, a small vertical tour surmounted upon the top of the tank, a pipe for conducting an emulsion mixture to the tower, a diverter in the tower receiving the emulsion mixture from said pipe and sharply directing it circumferentially within said tower, whereby a major portion of the gas is quickly scrubbed out, a gas pipe leading from the top of the tower, a head within the upper portion of the tank close to the top thereof forming a receiving chamber, the bottom of the tower being open to quickly discharge the residual liquids into said chamber, a pipe for more steadily carrying the residual oil and water mixture from the tower to the lower portion of the tank extending from the head at the bottom of the chamber, means for carrying off water from the tank and maintaining a body of water therein, inclined baffles within the tank immersed in the body of water providing a continuous back and forth travel of the oil and water mixture transversely through the body of water, means for artifically heating the body of water, and means for discharging oil from the upper portion of the tank.

4. In an oil, gas and water separator, a large upright tank, a small vertical tower surmounted upon the top of a tank, a pipe for conducting an emulsion mixture to the tower, a diverter in the tower receiving the emulsion mixture from said pipe and directing it circumferentially within said tower, whereby a major portion of the gas is quickly scrubbed out, a gas pipe leading from the top of the tower, a head within the upper portion of the tank forming a receiving chamber at the top of the tank, the bottom of the tower being open to quickly discharge the residual liquids into said chamber, a relatively small pipe for more steadily carrying the residual oil and water mixture from the tower to the lower portion of the tank extending from the head at the bottom of the chamber, means for carrying off water from the tank and maintaining a body of water therein, inclined baffles within the tank immersed in the body of water providing a continuous back and forth travel of the oil and water mixture transversely through the body of water, means for artifically heating the body of water, means for discharging oil from the upper portion of the tank, the oil and water conductor extending down one side of the tank adjacent the wall thereof, and an upright partition contiguous to the conductor and separating the baffles therefrom, said baffles coacting with the partition to elongate the upward travel of the oil and water mixture discharged from the conductor.

5. In an oil, gas and water separator, an upright tank, a tower mounted on top of the tank, means for introducing an oil, gas and water mixture into the tower intermediate its ends, whereby the mixture is whirled around the tower and the major portion of the gas is scrubbed out, a gas conductor leading from the top of the tower, a second gas conductor leading from the tower above the inlet and communicating with the tank, a conductor for carrying the residual liquids from the tower to the lower portion of the tank, a preheater having an influent inlet and connected with the means for introducing the emulsion mixture into the tower, and a gas conductor extending from the second gas pipe to the preheater.

6. In an oil, gas and water separator, the combination of a relatively large diameter upright tank of sufficient height for carrying out a complete oil washing operation therein, a vertical tower of relatively small diameter mounted upon and extending upwardly from the top of the tank, an inlet intermediate the ends of said tower for introducing an oil, gas and water mixture thereinto, means at the inlet for causing the mixture to quickly whirl around the tower for rapidly scrubbing out entrained gas to produce a more stable mixture, a gas discharge pipe leading from the tower above the inlet thereto, the lower end of the tower being open, a dished head extending across the upper end of the tank adjacent the lower open end of the tower for providing a receiving chamber in the tank between said head and the tower for receiving the oil and water mixture from which the gas is separated in the tower, means for carrying off water from the tank for maintaining a body of water therein of substantial height, a relatively small pipe for steadily carrying the oil and water mixture from the receiving chamber to the lower portion of the tank, means within the lower portion of the tank connected with said pipe for discharging the oil and water mixture into the body of water in a wide transverse path so that the oil and water mixture may flow upwardly through the body of water in amplified surficial contact therewith, means for artificially heating the body of water, and means for discharging oil from the tank at a point above the water level and below the transverse head.

JAY P. WALKER.